United States Patent [19]
Lynch

[11] Patent Number: 5,829,031
[45] Date of Patent: Oct. 27, 1998

[54] MICROPROCESSOR CONFIGURED TO DETECT A GROUP OF INSTRUCTIONS AND TO PERFORM A SPECIFIC FUNCTION UPON DETECTION

[75] Inventor: Thomas W. Lynch, Austin, Tex.

[73] Assignee: Advanced Micro Devices, Inc., Sunnyvale, Calif.

[21] Appl. No.: 605,869

[22] Filed: Feb. 23, 1996

[51] Int. Cl.[6] .................................................. G06F 12/00
[52] U.S. Cl. ...................... 711/137; 711/204; 711/213; 711/156
[58] Field of Search ................................ 364/200, 255.1; 395/125, 375, 390, 567, 394, 417, 800, 733, 412

[56] References Cited

U.S. PATENT DOCUMENTS

| | | | |
|---|---|---|---|
| 4,439,828 | 3/1984 | Martin ..................................... | 395/567 |
| 4,615,006 | 9/1986 | Hirano .................................... | 395/412 |
| 5,109,514 | 4/1992 | Garner et al. ........................... | 395/733 |
| 5,377,336 | 12/1994 | Eickemeyer et al. . | |
| 5,461,718 | 10/1995 | Tatosian et al. . | |
| 5,500,943 | 3/1996 | Ho et al. ................................. | 395/394 |
| 5,564,056 | 10/1996 | Fetteman et al. ..................... | 364/255.1 |
| 5,574,942 | 11/1996 | Colwell et al. ......................... | 395/800 |
| 5,613,083 | 3/1997 | Glew et al. ............................. | 395/417 |
| 5,615,350 | 3/1997 | Hesson et al. ......................... | 395/394 |
| 5,619,408 | 4/1997 | Black et al. ............................ | 395/567 |
| 5,625,788 | 4/1997 | Boggs et al. ........................... | 395/390 |

FOREIGN PATENT DOCUMENTS

| | | |
|---|---|---|
| 0 071 028 A2 | 2/1983 | European Pat. Off. . |
| 0 454 985 A2 | 11/1991 | European Pat. Off. . |
| 0 667 571 A2 | 8/1995 | European Pat. Off. . |
| 89/06397 | 7/1989 | WIPO . |

OTHER PUBLICATIONS

AMD's K5 Designed to Outrun Pentium Microprocessor Report, vol. 8, No. 14, Oct. 24, 1994, pp. 1, 6–11.

Meerbergen Van J. L., "Developments in Integrated Digital Signal Processors, and the PCT 5010," Philips Technical Review, vol. 44, No. 1, Mar. 1, 1988, pp. 1–14.

Chi–Hung Chi et al., "Reducing Data Access Penalty Using Intelligent Opcode–Driven Cache Prefetching," International Conference on Computer Design: VLSI in Computers and Processors, Austin, Oct. 2–4, 1995, Oct. 2, 1995, Institute of Electrical and Electronics Engineers, pp. 512–517.

International Search Report for PCT/US 97/02504, dated Nov. 5, 1997.

*Primary Examiner*—Tod R. Swann
*Assistant Examiner*—Fred F. Tzeng
*Attorney, Agent, or Firm*—Conley, Rose & Tayon, PC; B. Noel Kivlin

[57] ABSTRACT

A microprocessor is provided which includes a heuristic processing unit configured to detect a predefined group of instructions and to cause the performance of a specific function associated with the group of instructions. The specific function may correspond to the outcome of executing the group of instructions. Alternatively, the specific function may be a set of operations not directly corresponding to the group of instructions, but designed to improve the performance of the sequence of instructions within which the group of instructions is embedded. The heuristic processing unit asserts control signals to dedicated hardware to cause the specific function to be performed. Instruction sequences need not be modified from the instruction set employed by the microprocessor. The microprocessor detects the previously inefficient instruction sequences and performs the corresponding function efficiently.

22 Claims, 6 Drawing Sheets

MICROPROCESSOR CONFIGURED TO DETECT A GROUP OF INSTRUCTIONS AND TO PERFORM A SPECIFIC FUNCTION UPON DETECTION

BACKGROUND OF THE INVENTION

1. Field of the Invention

This invention relates to the field of microprocessors and, more particularly, to a microprocessor configured to detect a predetermined group of instructions and to perform a specific function upon detection of the group of instructions.

2. Description of the Relevant Art

Microprocessors are an integral part of computer systems, generally controlling other devices within the computer system. The performance of the computer system is often in large part dictated by the performance of the microprocessors included within the system. As used herein, the term microprocessor refers to an integrated circuit configured to execute instructions from an instruction set and to interface to other devices in a computer system in order to convey actions required by the instructions being executed. Exemplary microprocessors are general purpose microprocessors such as x86 microprocessors which control the entire computer system, microcontrollers often included within devices in a computer system to perform specific processing functions unique to the devices, and digital signal processors (DSPs) optimized for performing signal processing functions.

Computer systems have typically included a general purpose microprocessor which controls most aspects of computer system behavior. Other microprocessors such as microcontrollers and DSPs are often included to perform specific functions within portions of the computer system. These microcontrollers and DSPs are often optimized for the specific functions they perform, and typically operate as coprocessors under the direction of the general purpose microprocessor.

Performance of general purpose microprocessors has been steadily increasing. Performance increases have been realized due to improvements in operating frequencies and due to advances in the architectures to which microprocessors are designed. As a result, general purpose microprocessors are capable of controlling computer system behavior and may additionally be capable of assuming some of the coprocessing functions previously delegated to microcontrollers and DSPs. Cost savings may be realized in computer systems utilizing such microprocessors through the elimination of one or more coprocessors.

Unfortunately, the instruction sets commonly employed by general purpose microprocessors (e.g. the x86 instruction set) typically include basic mathematical operations and logical operations. Microcontrollers and particularly DSPs often offer instruction sets which are optimized for more complex mathematical algorithms such as convolutions, correlations, matrix computations, etc. These complex mathematical algorithms are commonly employed in the coprocessing functions handled by the microcontrollers and DSPs. The microcontrollers and DSPs include instructions which execute more complex operations then the basic mathematical operations supported by general purpose microprocessor instruction sets. For example, a common operation in DSP algorithms is a multiplication of a pair of operands followed by an addition of the product to a third operand. DSPs often include a multiply-add instruction which performs these two operations in a single instruction. The x86 microprocessor architecture, on the other hand, includes a multiply instruction and a separate add instruction. When these complex mathematical algorithms are coded using the x86 instruction set, a relatively larger number of instructions are often required as compared to the number of instructions from the instruction sets optimized for such algorithms. Due to this relatively large number of instructions, the algorithms may not execute upon the microprocessor as efficiently as the algorithms executed upon the coprocessors. A mechanism is desired for increasing the efficiency of the microprocessor for executing these algorithms.

SUMMARY OF THE INVENTION

The problems outlined above are in large part solved by a microprocessor in accordance with the present invention. The microprocessor includes a heuristic processing unit configured to detect a predefined group of instructions and to cause the performance of a specific function associated with the group of instructions. The specific function may correspond to the outcome of executing the group of instructions. Alternatively, the specific function may be a set of operations not directly corresponding to the group of instructions, but designed to improve the performance of the sequence of instructions within which the group of instructions is embedded. Advantageously, the microprocessor may include dedicated hardware for performing the specific function. The heuristic processing unit asserts control signals to the dedicated hardware to cause the specific function to be performed. Performance of the microprocessor may be increased by the more efficient performance of the function represented by the group of instructions. Alternatively, performance may be increased by the contribution of the specific function to the execution rate of the group of instructions, when the specific function does not directly correspond to the group of instructions. A further advantage of the techniques described herein is that the instruction sequences need not be modified from the instruction set employed by the microprocessor. Instead, the microprocessor detects the previously inefficient instruction sequences and performs the corresponding function efficiently.

Several exemplary embodiments are discussed herein. In a first embodiment, the heuristic processing unit detects a multiply instruction and an add instruction dependent upon that multiply instruction. In the first embodiment, the microprocessor includes an execute unit configured to concurrently perform a multiply and a dependent add operation. Upon detection of the multiply instruction and the dependent add instruction, the heuristic processing unit signals an instruction decode unit within the microprocessor. The instruction decode unit routes the multiply instruction and the dependent add instruction to the execute unit configured to perform the operations. Advantageously, the multiply-add sequence common to many DSP algorithms is performed more efficiently than achievable executing the instructions serially. In a second embodiment, the heuristic processing unit detects a pattern of memory accesses. Upon detection of the pattern, the heuristic processing unit is configured to cause a data cache within the microprocessor to begin prefetching additional data. Subsequent instructions may access the additional data and thereby execute more efficiently than if the prefetching is not performed. The exemplary embodiments further illustrate the advantages of the heuristic processing unit.

Broadly speaking, the present invention contemplates a microprocessor comprising an instruction cache, a control unit, and a second unit. The instruction cache is configured to store a plurality of instructions. Coupled to receive the plurality of instructions, the control unit is configured to detect a predetermined group of instructions indicative of a specific function. The group of instructions comprises at least two instructions from the plurality of instructions. Additionally, the control unit is configured to assert a control signal upon detection of the group of instructions. The second unit is coupled to receive the control signal and is configured to perform the specific function upon receipt of the control signal.

The present invention further contemplates a method for accelerating instruction execution in a microprocessor, comprising several steps. A plurality of instructions are fetched from an instruction cache. A predetermined group of instructions within the plurality of instructions are detected. The group of instructions represents a specific function. Upon detecting the predetermined group of instructions, the specific function is performed.

BRIEF DESCRIPTION OF THE DRAWINGS

Other objects and advantages of the invention will become apparent upon reading the following detailed description and upon reference to the accompanying drawings in which.

Figure 1:
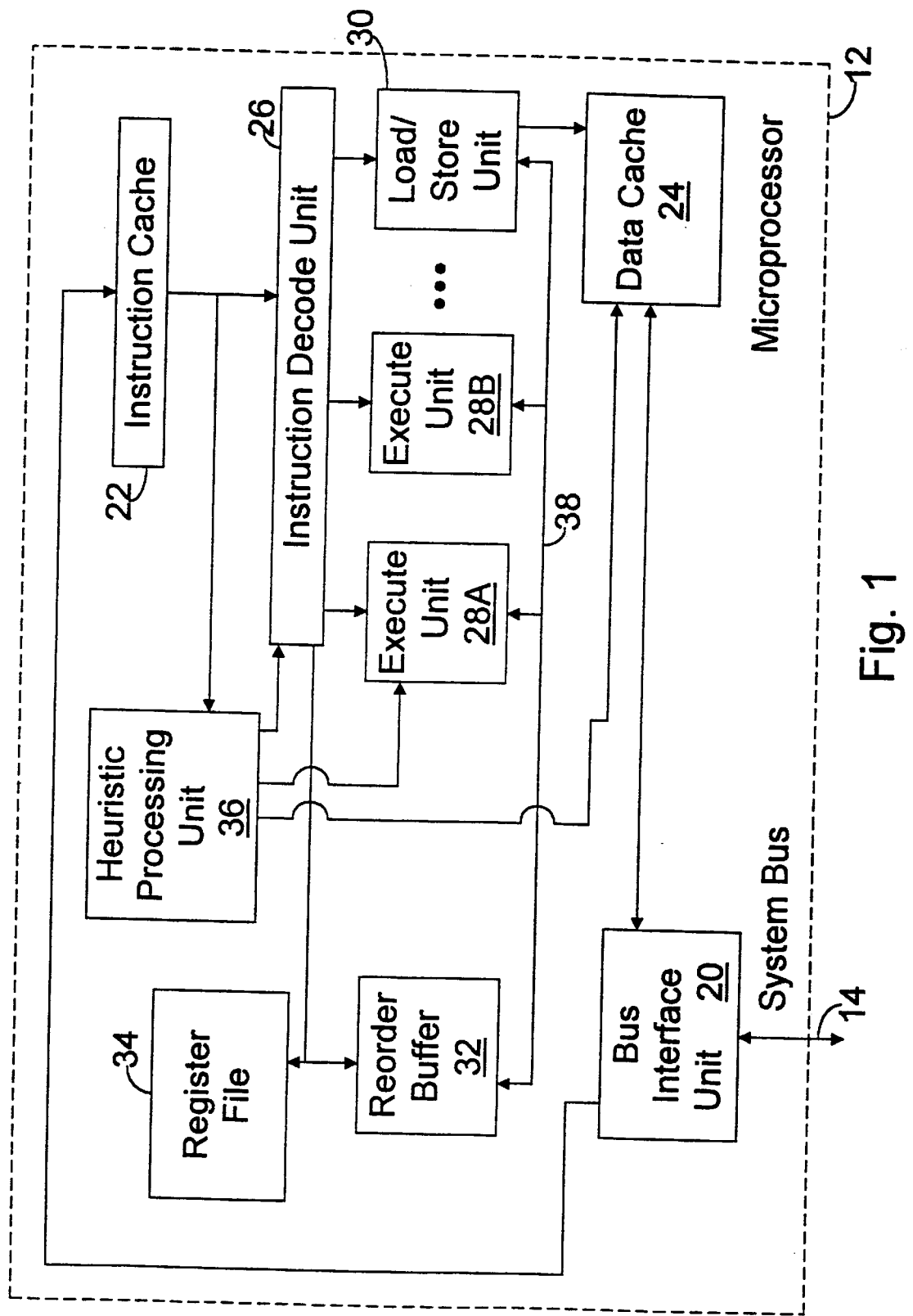
FIG. 1 is a block diagram of a first embodiment of a microprocessor including a heuristic processing unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of microprocessor 12 is shown. Microprocessor 12 includes a bus interface unit 20, an instruction cache 22, a data cache 24, an instruction decode unit 26, a plurality of execute units including execute units 28A and 28B, a load/store unit 30, a reorder buffer 32, a register file 34, and a heuristic processing unit 36. The plurality of execute units will be collectively referred to herein as execute units 28, and may include more execute units than execute units 28A and 28B shown in FIG. 1. Additionally, an embodiment of microprocessor 12 may include one execute unit 28. Bus interface unit 20 is coupled to instruction cache 22, data cache 24, and a system bus 14. Instruction cache 22 is coupled to heuristic processing unit 36. Additionally, instruction cache 22 is coupled to instruction decode unit 26, which is further coupled to execute units 28, reorder buffer 32, register file 34, and load/store unit 30. Reorder buffer 32, execute units 28, and load/store unit 30 are each coupled to a result bus 38 for forwarding of execution results. Load/store unit 30 is coupled to data cache 24. Heuristic processing unit 36 is coupled to instruction decode unit 26, execute unit 28A, and data cache 24.

Generally speaking, heuristic processing unit 36 is configured to detect predetermined groups of instructions which are indicative of a specific function. Upon detection of a group of instructions, heuristic processing unit 36 asserts control signals to other units within microprocessor 12. The other units, upon receipt of the control signals, perform the specific function. Advantageously, multiple instructions which represent a function may be distilled into that function. Instead of executing the multiple instructions to achieve the result corresponding to the function, the function itself is performed. Performance may be increased to the extent that the multiple instructions require more time to execute individually than recognizing the function and performing the function with dedicated hardware. According to various embodiments, one or more of instruction decode unit 26, execute unit 28A, or data cache 24 may receive control signals from heuristic processing unit 36. Examples of groups of instructions detected and the corresponding specific functions are described below with respect to FIGS. 2 through 4.

As used herein, a group of instructions refers to two or more instructions which occur in a particular order within a program and have a particular relationship to one another (e.g. one instruction within the group may be dependent upon another). The instructions may not be consecutive. Each group of instructions represents a specific function which microprocessor 12 is configured to perform.

Generally, a specific function is not attributable to one instruction within the instruction set executed by microprocessor 12. Instead, the function is either indicative of the result of executing the group of instructions as a whole, or is a set of operations designed to increase the performance of the instructions being executed (either instructions within the group of instructions or instructions subsequent to the group of instructions). The relationship between the specific function and the group of instructions may be predetermined via study of instruction sequences which are deemed to be inefficient in the instruction set executed by microprocessor 12, for example. Other relationships between specific functions and associated instruction sequences may be assigned by studying the behavior of instruction sequences and the effect these sequences have upon portions of microprocessor 12. A variety of techniques may be used to determine specific functions to be associated with instruction sequences. In one embodiment, microprocessor 12 comprises an x86 microprocessor configured to execute the x86 instruction set.

Instruction cache 22 is a high speed cache memory for storing instructions. It is noted that instruction cache 22 may be configured into a fully associative, set-associative, or direct mapped configuration. Instruction cache 22 may additionally include a branch prediction mechanism for predicting branch instructions as either taken or not taken. Instructions are fetched from instruction cache 22 and conveyed to instruction decode unit 26 for decode and dispatch to an execution unit. Additionally, instructions are conveyed to heuristic processing unit 36 for detection of the predefined groups of instructions.

In the embodiment shown, instruction decode unit 26 decodes each instruction fetched from instruction cache 22.

Instruction decode unit 26 dispatches each instruction to execute units 28 and/or load/store unit 30. Instruction decode unit 26 also detects the register operands used by the instructions dispatched to execute units 28 and/or load/store unit 30 and requests these operands from reorder buffer 32 and register file 34. In one embodiment, execute units 28 are symmetrical execution units. Symmetrical execution units are each configured to execute a particular subset of the instruction set employed by microprocessor 12. The subsets of the instruction set executed by each of the symmetrical execution units are the same. In another embodiment, execute units 28 are asymmetrical execution units configured to execute dissimilar instruction subsets. For example, execute units 28 may include a branch execute unit for executing branch instructions, one or more arithmetic/logic units for executing arithmetic and logical instructions, and one or more floating point units for executing floating point instructions. Instruction decode unit 26 dispatches an instruction to an execute unit 28 or load/store unit 30 which is configured to execute that instruction. As used herein, the term "dispatch" refers to conveying an instruction to an appropriate execution unit or load/store unit for execution of the instruction.

Load/store unit 30 provides an interface between execute units 28 and data cache 24. Load and store memory operations are performed by load/store unit 30 to data cache 24. Additionally, memory dependencies between load and store memory operations are detected and handled by load/store unit 30.

Execute units 28 and load/store unit 30 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 26, execute units 28, and load/store unit 30. Such an embodiment may perform the dispatch function within the centralized reservation station.

Microprocessor 12 supports out of order execution, and employs reorder buffer 32 for storing execution results of speculatively executed instructions and storing these results into register file 34 in program order, for performing dependency checking and register renaming, and for providing for mispredicted branch and exception recovery. When an instruction is decoded by instruction decode unit 26, requests for register operands are conveyed to reorder buffer 32 and register file 34. In response to the register operand requests, one of three values is transferred to the execute unit 28 and/or load/store unit 30 which receives the instruction: (1) the value stored in reorder buffer 32, if the value has been speculatively generated; (2) a tag identifying a location within reorder buffer 32 which will store the result, if the value has not been speculatively generated; or (3) the value stored in the register within register file 34, if no instructions within reorder buffer 32 modify the register. Additionally, a storage location within reorder buffer 32 is allocated for storing the results of the instruction being decoded by instruction decode unit 26. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 28 or load/store unit 30 execute an instruction, the tag assigned to the instruction by reorder buffer 32 is conveyed upon result bus 38 along with the result of the instruction. Reorder buffer 32 stores the result in the indicated storage location. Additionally, execute units 28 and load/store unit 30 compare the tags conveyed upon result bus 38 with tags of operands for instructions stored therein. If a match occurs, the unit captures the result from result bus 38 and stores it with the corresponding instruction. In this manner, an instruction may receive the operands it is intended to operate upon. Capturing results from result bus 38 for use by instructions is referred to as "result forwarding".

Instruction results are stored into register file 34 by reorder buffer 32 in program order. Storing the results of an instruction and deleting the instruction from reorder buffer 32 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 32 discards the instructions subsequent to the mispredicted branch instructions. Instructions thus discarded are also flushed from execute units 28, load/store unit 30, and instruction decode unit 26.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Register file 34 includes storage locations for each register defined by the microprocessor architecture employed by microprocessor 12. For example, microprocessor 12 may employ the x86 microprocessor architecture. For such an embodiment, register file 34 includes locations for storing the EAX, EBX, ECX, EDX, ESI, EDI, ESP, and EBP register values.

Data cache 24 is a high speed cache memory configured to store data to be operated upon by microprocessor 12. It is noted that data cache 24 may be configured into a fully associative, set-associative, or direct-mapped configuration.

Bus interface unit 20 is configured to effect communication between microprocessor 12 and devices coupled to system bus 14. For example, instruction fetches which miss instruction cache 22 may be transferred from main memory by bus interface unit 20. Similarly, data requests performed by load/store unit 30 which miss data cache 24 may be transferred from main memory by bus interface unit 20. Additionally, data cache 24 may discard a cache line of data which has been modified by microprocessor 12. Bus interface unit 20 transfers the modified line to main memory.

It is noted that instruction decode unit 26 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 24, executing the instruction, and transferring the result to memory (if the destination operand is a memory location). Load/store unit 30 performs the memory transfers, and an execute unit 28 performs the execution of the instruction.

Figure 1A:
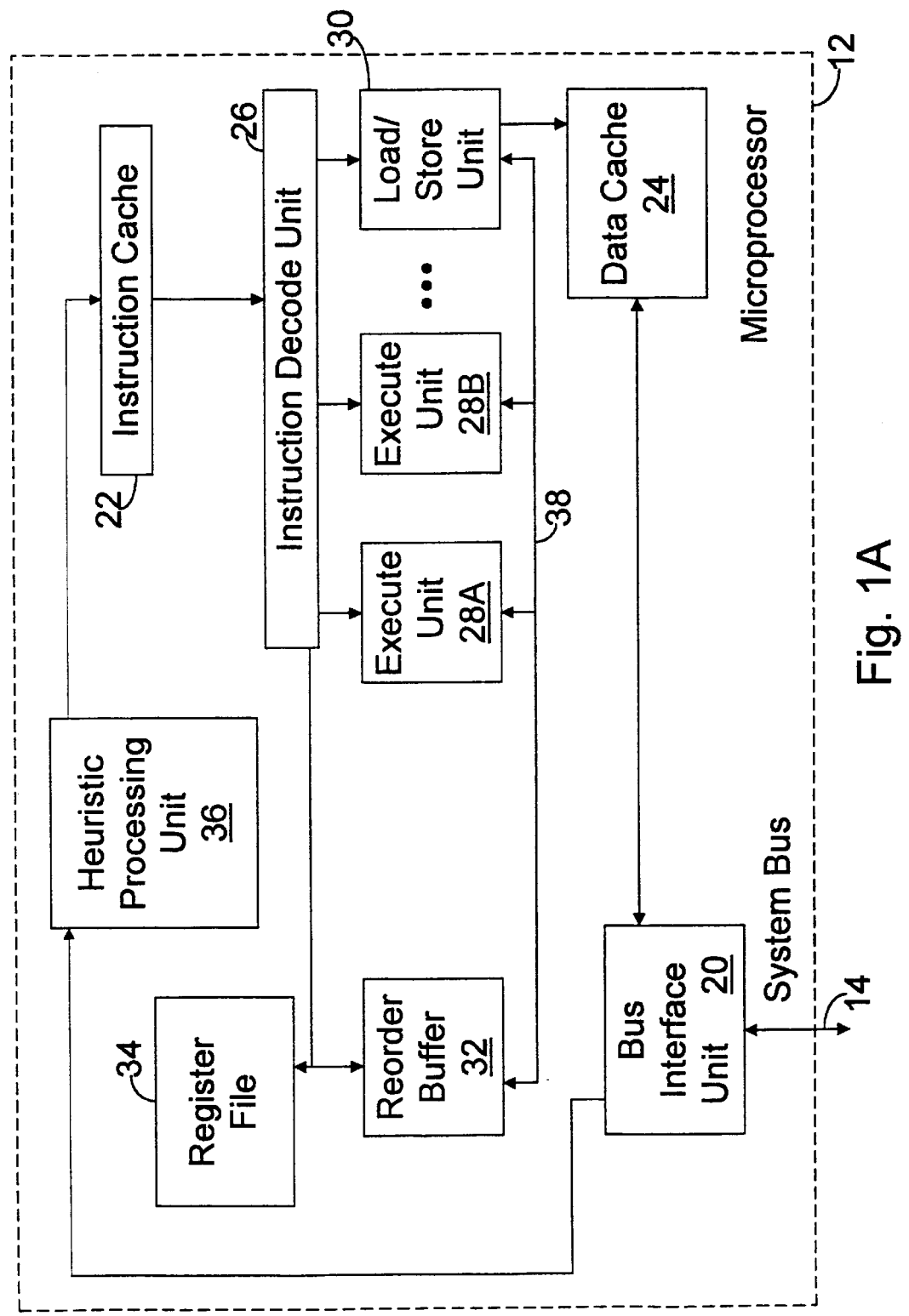
FIG. 1A is a block diagram of a second embodiment of a microprocessor including a heuristic processing unit.

Turning next to FIG. 1A, a second embodiment of microprocessor 12 is shown. Like numbered elements shown in FIGS. 1 and 1A are similar. In the second embodiment, heuristic processing unit 36 is coupled between bus interface unit 20 and instruction cache 22. Heuristic processing unit 36 detects predetermined groups of instructions, as described above, but stores the control signals in instruction cache 22 along with the instructions. Instruction cache 22 or instruction decode unit 26 may then assert the control signals (shown in FIG. 1) when the corresponding instructions are fetched from instruction cache 22. Alternatively, heuristic processing unit 36 may translate the predetermined group of instructions into an instruction which performs the operations identified by the predetermined group of instructions. Such an embodiment of heuristic processing unit 36 may be included in an embodiment of microprocessor 12 which executes a different instruction set than the predetermined group of instructions are coded in.

It is noted that the configuration of FIG. 1A additionally features the advantage of operating according to the bus clock cycle employed by bus interface unit 20 and devices attached to system bus 14. The remainder of microprocessor 12 operates according to a typically faster processor clock cycle. A processor clock cycle which is twice or three times the frequency of the bus clock cycle is common in modern microprocessors. The lower clock cycle allows additional time for heuristic processing unit 36 to detect predetermined groups of instructions as instructions are fetched into instruction cache 22.

Figure 2:
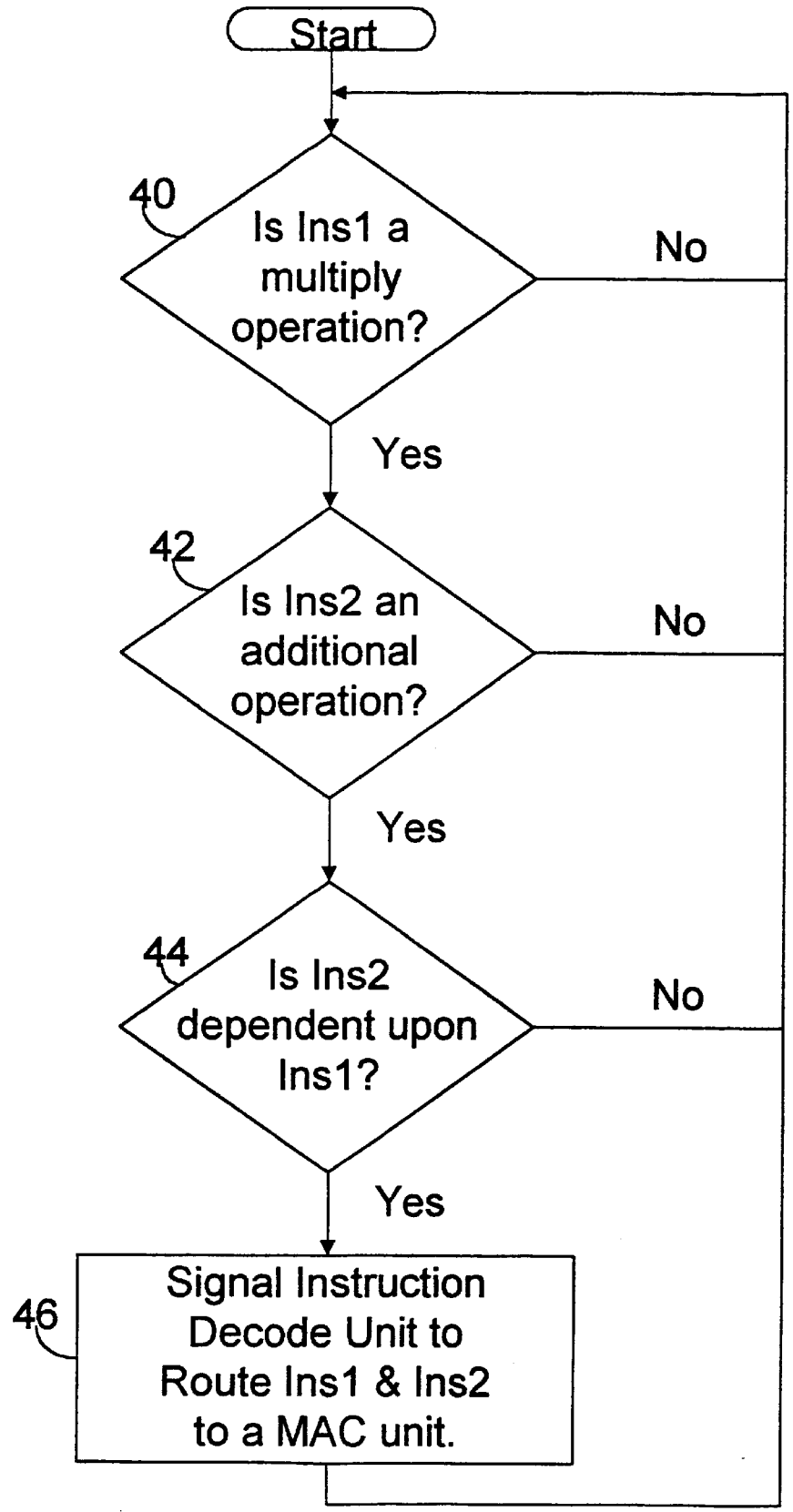
FIG. 2 is a flow chart showing steps performed according to a first embodiment of the heuristic processing unit shown in FIGS. 1 and 2.
Figure 3:
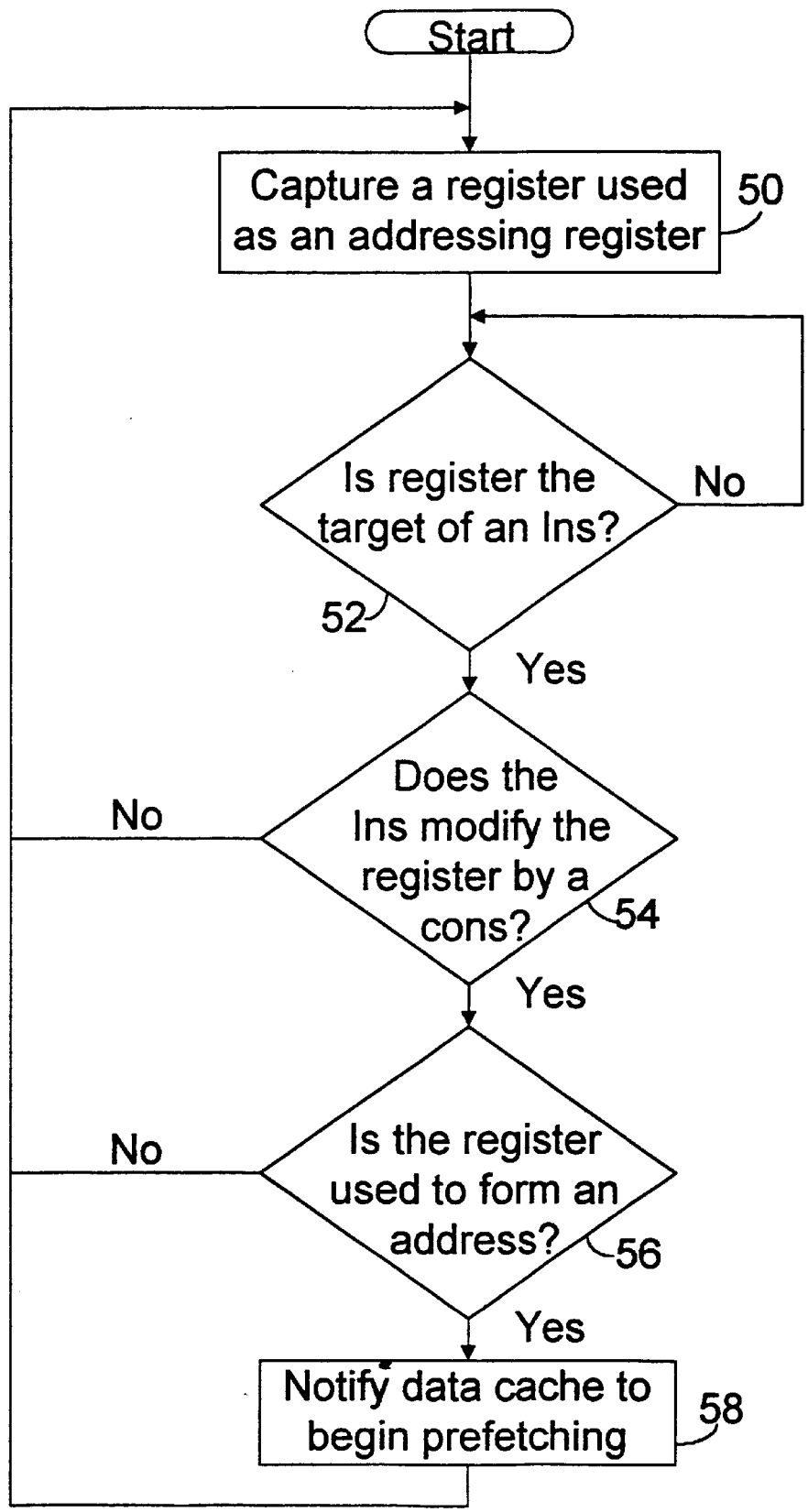
FIG. 3 is a flow chart showing steps performed according to a second embodiment of the heuristic processing unit shown in FIGS. 1 and 2.
Figure 4:
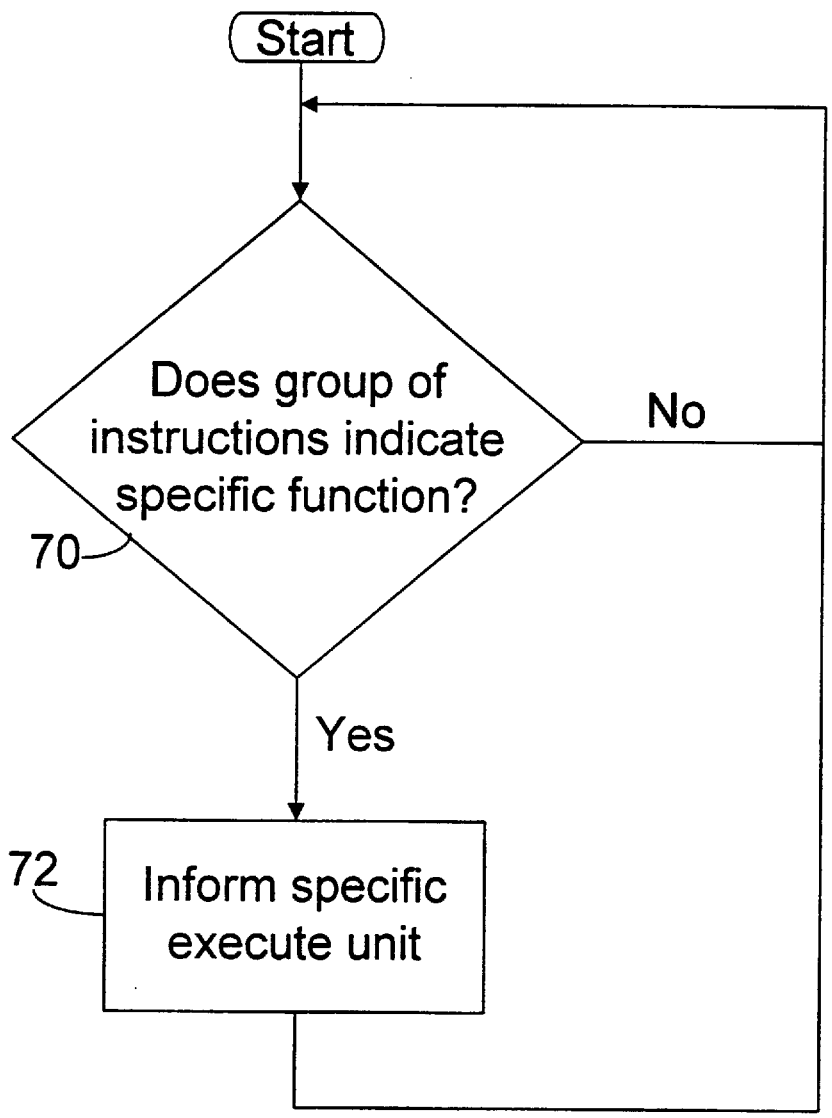
FIG. 4 is a flow chart showing steps performed according to a third embodiment of the heuristic processing unit shown in FIGS. 1 and 2.

Turning now to FIGS. 2 through 4, several embodiments of heuristic processing unit 36 are shown in flow chart form. Circuitry implementing the flowchart may take the form of a state machine in which detection of the various instructions within the group is performed as a set of sequential states. Alternatively, circuitry implementing the flowchart may involve both a state machine for detecting instructions within a group which are fetched at different times, as well as combinational logic used to detect several instructions within the group of instructions which are fetched concurrently. Still further, embodiments of heuristic processing unit 36 may employ multiple state machines which independently search for different predetermined groups of instructions.

FIG. 2 represents an embodiment of heuristic processing unit 36 which detects a group of instructions corresponding to a multiply-add function (i.e. the specific function is the multiply-add function). The multiply-add function is used often in digital signal processing algorithms, and comprises a multiply of two operands producing a product which is subsequently added to a third operand. The result of the addition is the result of the multiply-add function. In the x86 instruction set, a multiply instruction and an add instruction are included. Heuristic processing unit 36 detects the multiply instruction followed by a dependent add instruction (i.e. an add instruction which receives the product formed by the multiply instruction as an operand). For the embodiment of FIG. 2, microprocessor 12 includes an execute unit 28 which is configured to perform a multiply and a dependent add as a single operation. For example, the execute unit 28 may include a hardware multiplier coupled to an adder circuit. When heuristic processing unit 36 detects the group of instructions comprising the multiply instruction and the add instruction dependent upon the multiply instruction, heuristic processing unit 36 asserts a control signal to instruction decode unit 26. Upon receipt of the control signal, instruction decode unit 26 routes the multiply and dependent add instructions together to the execute unit 28 which performs the operation. Advantageously, the multiply and add instructions are performed simultaneously even though the add instruction is dependent upon the multiply instruction.

In order to detect the multiply-add group of instructions, heuristic processing unit 36 is configured to first detect a multiply instruction (step 40). If no multiply instruction is detected, heuristic processing unit 36 remains idle. However, if a multiply instruction is detected, heuristic processing unit 36 proceeds to step 42.

Heuristic processing unit 36 examines instructions subsequent to the multiply instruction for an addition instruction. Although FIG. 2 shows step 42 returning to step 40 if the subsequent instruction is not an addition operation, heuristic processing unit 36 may in fact continue searching instructions for an addition operation. If another multiply instruction is detected while examining instructions for an addition operation, the newly discovered multiply instruction is noted and the former multiply operation is discarded. When heuristic processing unit 36 discovers an addition instruction, heuristic processing unit 36 determines if the addition operation is dependent upon the multiply operation (step 44). If the addition instruction is dependent upon the multiply operation, then heuristic processing unit 36 has identified a multiply-add function.

Upon detection of the multiply-add function, heuristic processing unit 36 informs instruction decode unit 26 of the detection via control signals (step 46). Heuristic processing unit 36 then returns to the initial state and begins searching for a subsequent occurrence of the group of instructions corresponding to the multiply-add function.

Turning next to FIG. 3, a flowchart representing a second embodiment of heuristic processing unit 36 is shown. In this embodiment, heuristic processing unit 36 detects a pattern of data accesses by a group of instructions. Upon detection of a pattern of data accesses, heuristic processing unit 36 may cause data cache 24 to begin prefetching additional data according to the pattern. As used herein, data is prefetched if it is transferred to data cache 24 prior to an instruction being executed which accesses that data. In this manner, data accesses which might otherwise have missed data cache 24 may hit data cache 24. Therefore, the specific function associated with this embodiment is a data prefetch function. Performance degradation due to data cache misses may advantageously be reduced. Such a pattern of accesses may be particularly evident in a loop of code in which a memory access is made, the accessed data is manipulated, the addressing register is modified, the memory access is performed again, etc. Therefore, microprocessor 12 may be configured to detect data access patterns within a loop, and to replace the memory access and increment/decrement operation with a memory operation which automatically increments/decrements the register value which is used to form the address.

The group of instructions detected according to FIG. 3 includes: (a) an instruction specifying a memory operation having an address formed using a value stored in a register; (b) an instruction subsequent to instruction (a) which increments or decrements the value stored in the register by a constant value; and (c) another instruction subsequent to instructions (a) and (b) specifying a memory operation having an address formed using the value stored in the register. As used herein, a memory operation refers to a transfer of data between microprocessor 12 and a main memory coupled to system bus 14.

Heuristic processing unit 36 begins detection of the group of instructions at step 50 by capturing a register used as an addressing register (i.e. a register storing a value used to form the address of a memory operation). Subsequent instructions are analyzed by heuristic processing unit 36 according to steps 52, 54, and 56. If the register is found to be the target of another instruction (step 52), and the instruction modifies the register by a constant value (step 54), and the register is used in a subsequent instruction to form an address (step 56), then heuristic processing unit 36 notifies data cache 24 to begin prefetching (step 58). Additional control signals coupled between heuristic control unit 36 and data cache 24 convey the address formed for the memory operation and the constant value by which the register value is modified. Data cache 24 may then generate subsequent addresses and prefetch data into data cache 24 through bus interface unit 20. For example, data cache 24 may generate a first prefetch address by adding the address received from heuristic control unit 36 to the constant value received therefrom. A second prefetch address may then be generated by adding the first prefetch address to the constant value, etc. It is noted that the constant value by which the register value is modified is often referred to as a "stride". The stride determines the distance between consecutive memory accesses if the constant value is continually used to update the register which forms the address.

If, at step 52, the register captured at step 50 is not used as a target of a subsequent instruction, then heuristic processing unit 36 continues searching for an instruction which uses the register as a target. A register is a target of an instruction if the register is modified via execution of the instruction. Once an instruction having the register as a target is detected, heuristic processing unit 36 determines if the register is updated by adding a constant value to the value of the register prior to instruction execution. Adding a constant value may indicate that additional data is accessed at regular intervals within main memory with respect to the address generated by instruction (a). For example, heuristic processing unit 36 may detect an add instruction having the register and an immediate field as operands. Alternatively, heuristic processing unit 36 may detect an increment instruction which operates upon the register. Other alternatives may additionally be detected by heuristic processing unit 36.

If the register is not modified by a constant value, heuristic processing unit 36 returns to step 50 to capture a new register and begin the process again. Modification by a non-constant value is often not indicative of a data access pattern in which data is accessed at regular intervals, and therefore prefetching by adding a constant value to a previously generated address may not be beneficial.

It is noted that step 56 is included to detect a second memory operation which uses the captured register to form an address. In another embodiment, step 56 is not performed by heuristic processing unit 36. By performing step 56, heuristic processing unit 36 may cause prefetching to occur less often then if step 56 is not performed. Essentially, step 56 detects the second use of the register to form an address without the register value being modified by a non-constant value. Therefore, the embodiment shown in FIG. 3 causes prefetching after the pattern of data accesses has been established. If step 56 is not performed, then heuristic processing unit 36 speculates that a data access pattern of regular interval accesses is occurring when it detects modification of the captured register by a constant value. External considerations (such as the type of computer system which microprocessor 12 may be employed within) may be used to determine if step 56 should be included in a particular embodiment. It is further noted that is step 56 is eliminated, instruction (c) is not included in the group of instructions detected by heuristic processing unit 36.

Turning now to FIG. 4, a flowchart generally applicable to the operation of heuristic processing unit 36 is shown. During step 60, heuristic processing unit 36 detects a group of instructions which is predefined to indicate a specific function. When heuristic processing unit 36 detects the group of instructions, a specific unit within microprocessor 12 is informed by heuristic processing unit 36 (step 62). The specific unit is configured to perform the specific function when informed of detection of the group of instructions. Heuristic processing unit 36 may communicate with the specific unit in any fashion, but uses one or more control signals in one embodiment. Assertion of the control signals by heuristic processing unit 36 indicates that the group of instructions has been detected.

It is noted that heuristic processing unit 36 may be configured to detect multiple groups of instructions and to assert control signals which cause performance of multiple specific functions. For example, the embodiments of both FIGS. 2 and 3 may be included in another embodiment of heuristic processing unit 36.

Figure 5:
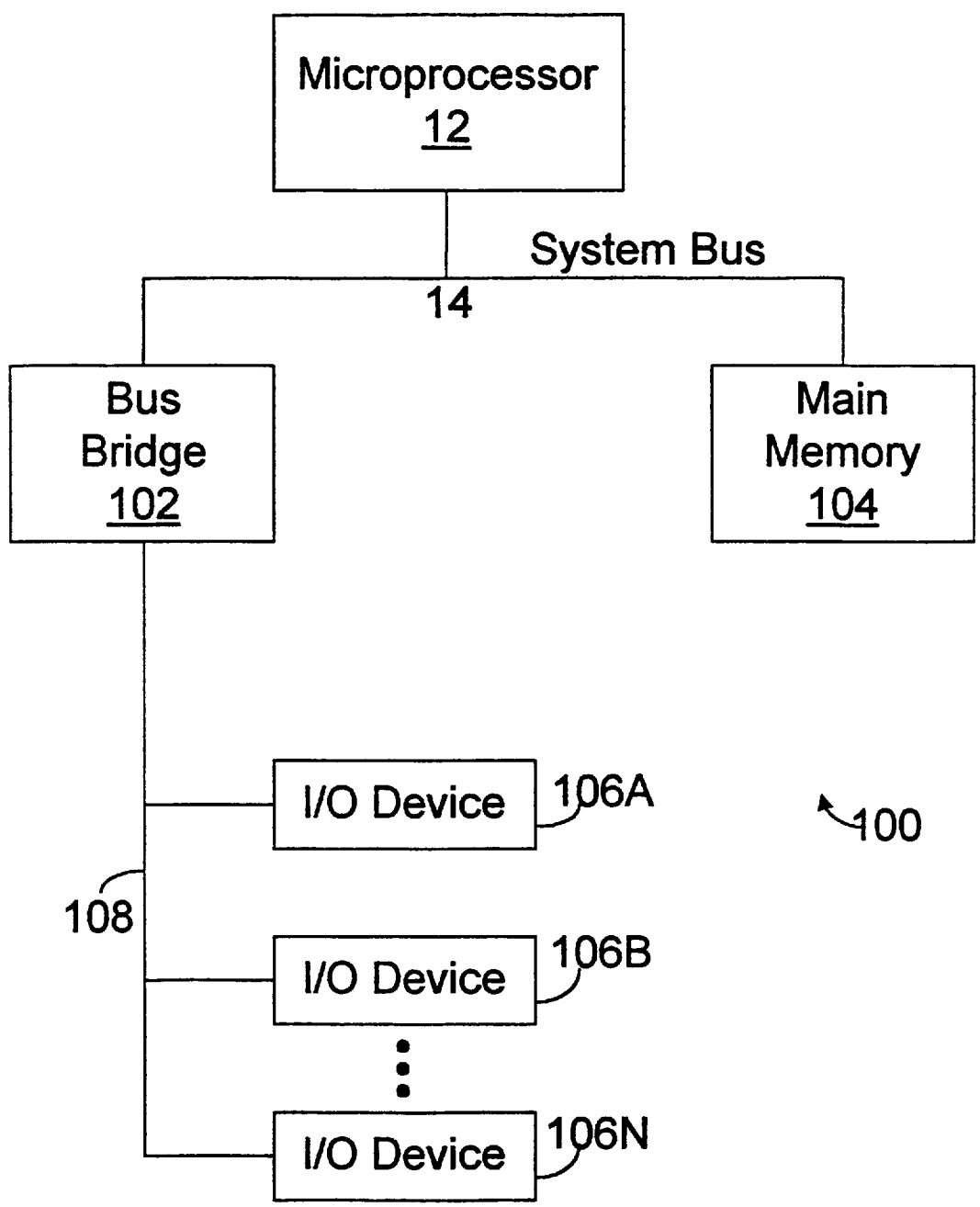
FIG. 5 is a block diagram of a computer system including the microprocessor shown in FIG. 1.

Turning now to FIG. 5, a computer system 100 including microprocessor 12 is shown. Computer system 100 further includes a bus bridge 102, a main memory 104, and a plurality of input/output (I/O) devices 106A–106N. Plurality of I/O devices 106A–106N will be collectively referred to as I/O devices 106. Microprocessor 12, bus bridge 102, and main memory 104 are coupled to system bus 14. I/O devices 106 are coupled to an I/O bus 108 for communication with bus bridge 102.

Bus bridge 102 is provided to assist in communications between I/O devices 106 and devices coupled to system bus 14. I/O devices 106 typically require longer bus clock cycles than microprocessor 12 and other devices coupled to system bus 14. Therefore, bus bridge 102 provides a buffer between system bus 14 and input/output bus 108. Additionally, bus bridge 102 translates transactions from one bus protocol to another. In one embodiment, input/output bus 108 is an Enhanced Industry Standard Architecture (EISA) bus and bus bridge 102 translates from the system bus protocol to the EISA bus protocol. In another embodiment, input/output bus 108 is a Peripheral Component Interconnect (PCI) bus and bus bridge 102 translates from the system bus protocol to the PCI bus protocol. It is noted that many variations of system bus protocols exist. Microprocessor 12 may employ any suitable system bus protocol.

I/O devices 106 provide an interface between computer system 100 and other devices external to the computer system. Exemplary I/O devices include a modem, a serial or parallel port, a sound card, etc. I/O devices 106 may also be referred to as peripheral devices. Main memory 104 stores data and instructions for use by microprocessor 12. In one embodiment, main memory 104 includes at least one Dynamic Random Access Memory (DRAM) and a DRAM memory controller.

It is noted that although computer system 100 as shown in FIG. 5 includes one microprocessor, other embodiments of computer system 100 may include multiple microprocessors similar to microprocessor 12. Similarly, computer system 100 may include multiple bus bridges 102 for translating to multiple dissimilar or similar I/O bus protocols. Still further, a cache memory for enhancing the performance of computer system 100 by storing instructions and data referenced by microprocessor 12 in a faster memory storage may be included. The cache memory may be inserted between microprocessor 12 and system bus 14, or may reside on system bus 14 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a microprocessor has been described which detects certain predetermined groups of instructions and performs a specific function upon detection of the group of instructions. The specific function may perform the operation represented by the group of instructions or may perform an operation designed to increase the rate at which instructions are executed. Performance may be increased to the degree that the specific function is executed more quickly than the group of instructions may be executed, or to the degree that the specific function increases the rate at which instructions are executed.

Numerous variations and modifications will become apparent to those skilled in the art once the above disclosure is fully appreciated. It is intended that the following claims be interpreted to embrace all such variations and modifications.

What is claimed is:

1. A microprocessor comprising:
an instruction cache configured to store a plurality of instructions;
a control unit coupled to receive said plurality of instructions, wherein said control unit is configured to examine said plurality of instructions to detect a predetermined group of instructions indicative of a specific function, and wherein said group of instructions comprises at least two instructions from said plurality of instructions, and wherein said control unit is configured to assert a control signal upon detection of said group of instructions; and
a second unit coupled to receive said control signal, wherein said second unit is configured to perform said specific function upon receipt of said control signal.

2. The microprocessor as recited in claim 1 wherein said second unit comprises an instruction decode unit configured to decode said plurality of instructions and to dispatch said plurality of instructions to at least one execute unit.

3. The microprocessor as recited in claim 2 wherein said group of instructions comprises a multiply instruction and an add instruction dependent upon said multiply instruction.

4. The microprocessor as recited in claim 3 wherein said specific function comprises a multiply-add function.

5. The microprocessor as recited in claim 3 wherein said instruction decode unit is configured to route said multiply instruction and said add instruction together to an execute unit upon receipt of said control signal.

6. The microprocessor as recited in claim 1 wherein said second unit comprises a data cache configured to store data operated upon by said plurality of instructions.

7. The microprocessor as recited in claim 6 wherein said group of instructions comprises a memory operation having a register which stores a value used to form an address of said memory operation and an instruction which modifies said value by a constant value.

8. The microprocessor as recited in claim 7 wherein said specific function comprises prefetching additional data.

9. The microprocessor as recited in claim 8 wherein said data cache is configured to prefetch said additional data upon receipt of said control signal.

10. The microprocessor as recited in claim 9 wherein said control unit further comprises a plurality of control signals, and wherein certain ones of said plurality of control signals are configured to convey said address of said memory operation, and wherein certain other ones of said plurality of control signals are configured to convey said constant value.

11. The microprocessor as recited in claim 10 wherein said data cache prefetches said additional data from addresses generated by adding said constant value to said address of said memory operation.

12. The microprocessor as recited in claim 7 wherein said group of instructions further comprises a second memory operation using said value stored in said register to form an address of said second memory operation.

13. The microprocessor as recited in claim 12 wherein said second memory operation is subsequent, in program order, to said instruction which modifies said value by said constant value.

14. The microprocessor as recited in claim 1 wherein said control unit is configured to receive said plurality of instructions prior to storing said plurality of instructions in said instruction cache, and wherein said instruction cache is configured to store said control signal in said instruction cache with said plurality of instructions and to transmit said control signal to said second unit.

15. The microprocessor as recited in claim 1 wherein said second unit is an execute unit dedicated to performing said specific function, said microprocessor further comprising at least one execute unit configured to individually execute said instructions in said predetermined group of instructions.

16. A microprocessor comprising:
an instruction cache configured to store a plurality of instructions;
a control unit coupled to receive said plurality of instructions from said instruction cache, wherein said control unit is configured to detect a predetermined group of instructions indicative of a specific function, and wherein said group of instructions comprises at least two instructions from said plurality of instructions, and wherein said control unit is configured to assert a control signal upon detection of said group of instructions; and
a second unit coupled to receive said control signal, wherein said second unit is configured to perform said specific function upon receipt of said control signal, wherein said second unit comprises an instruction decode unit configured to decode said plurality of instructions and to dispatch said plurality of instructions to at least one execute unit;
wherein said group of instructions comprises a multiply instruction and an add instruction dependent upon said multiply instruction, and wherein said instruction decode unit is configured to route said multiply instruction and said add instruction together to an execute unit upon receipt of said control signal, and wherein said execute unit is configured to perform said multiply instruction and said add instruction concurrently, passing a product of said multiply instruction to said add instruction.

17. A method for accelerating instruction execution in a microprocessor, comprising:
fetching a plurality of instructions from an instruction cache;
examining said plurality of instructions to detect a predetermined group of instructions within said plurality of instructions, wherein said group of instructions represents a specific function; and performing said specific function upon fetching said plurality of instructions.

18. The method as recited in claim 17 wherein said specific function is performed instead of executing said group of instructions.

19. The method as recited in claim 18 wherein said group of instructions comprises a multiply instruction and an add instruction dependent upon said multiply instruction, and wherein said specific function comprises a multiply-add function.

20. The method as recited in claim 17 further comprising executing said group of instructions.

21. The method as recited in claim 20 wherein said group of instructions comprise a memory operation having a register which stores a value used to form an address of said memory operation, and an instruction which modifies said value stored in said register by a constant value.

22. The method as recited in claim 21 wherein said memory operation and said instruction which modifies said value are within a loop, and wherein said memory operation and said instruction are replaced by another memory operation which also modifies said register by said constant value.

\* \* \* \* \*